United States Patent [19]

Nagashima

[11] Patent Number: 4,764,093
[45] Date of Patent: Aug. 16, 1988

[54] OIL PUMP FOR CHAIN SAW

[75] Inventor: Akira Nagashima, Kawasaki, Japan

[73] Assignee: Kioritz Corporation, Tokyo, Japan

[21] Appl. No.: 42,886

[22] Filed: Apr. 27, 1987

[30] Foreign Application Priority Data

Apr. 30, 1986 [JP] Japan .............................. 61-65775[U]

[51] Int. Cl.$^4$ ............................................. F04B 49/00
[52] U.S. Cl. ........................................ 417/500; 92/13; 184/33
[58] Field of Search ................. 417/492, 500; 184/33, 184/35, 15.1; 30/123.4; 92/13, 13.5, 13.6

[56] References Cited

U.S. PATENT DOCUMENTS

| 1,238,939 | 9/1917 | Pfleeger | 417/500 |
|---|---|---|---|
| 2,070,203 | 2/1937 | Gregg | 417/500 |
| 4,000,790 | 1/1977 | Seuter | 184/33 |
| 4,034,830 | 7/1977 | Mukai | 184/33 |
| 4,036,326 | 7/1977 | Mukai | 184/33 |
| 4,636,147 | 1/1987 | Schweitzer | 184/33 |
| 4,678,411 | 7/1987 | Wieland | 417/500 |

Primary Examiner—Leonard E. Smith
Attorney, Agent, or Firm—Browdy and Neimark

[57] ABSTRACT

An oil pump for use in a chain saw in which the pumping plunger is constituted by a needle roller and in which gear cam portions which are formed separately from the needle roller are fitted and connected to the needle roller.

10 Claims, 1 Drawing Sheet

OIL PUMP FOR CHAIN SAW

BACKGROUND OF THE INVENTION

1. Field of the Invention

This invention relates to an oil pump for supplying lubricating oil to a saw chain of a chain saw.

2. Description of the Prior Art

In an example of this type of conventional oil pump such as disclosed in U.S. Pat. No. 4,231,716, a worm engaging with and driven by a worm wheel and a rate adjusting cam are integrally formed with a pumping plunger by machining from a one-piece blank provided for the plunger.

To form this type of integral part for use in the conventional device, it is necessary to carry out different work processes with respect to one blank so as to form the tooth of the worm, the cam portion and so forth along with the work of forming the plunger. At the same time, these portions are required to be worked with high accuracy. Therefore it takes a large amount of labor to manufacture the pump, resulting in a high production cost.

SUMMARY OF THE INVENTION

It is therefore an object of the present invention to provide an oil pump which is free from the above-described problems of the oil pump for use in the conventional chain saw and which has a simple construction and is convenient.

To this end, the present invention provides an oil pump for supplying lubricating oil to a saw chain of a chain saw in which the pumping plunger is constituted by a cylindrical shaft such as a needle roller and in which gear and cam portions which are formed separately from the needle roller are fitted and connected to the needle roller.

This arrangement of the present invention makes it possible to form the pumping plunger by selecting suitable blanks which have previously been worked with high accuracy. That is, it enables the oil pump to be manufactured through a simple process and to be improved in performance and durability.

DESCRIPTION OF THE PREFERRED EMBODIMENT

Figure 1:
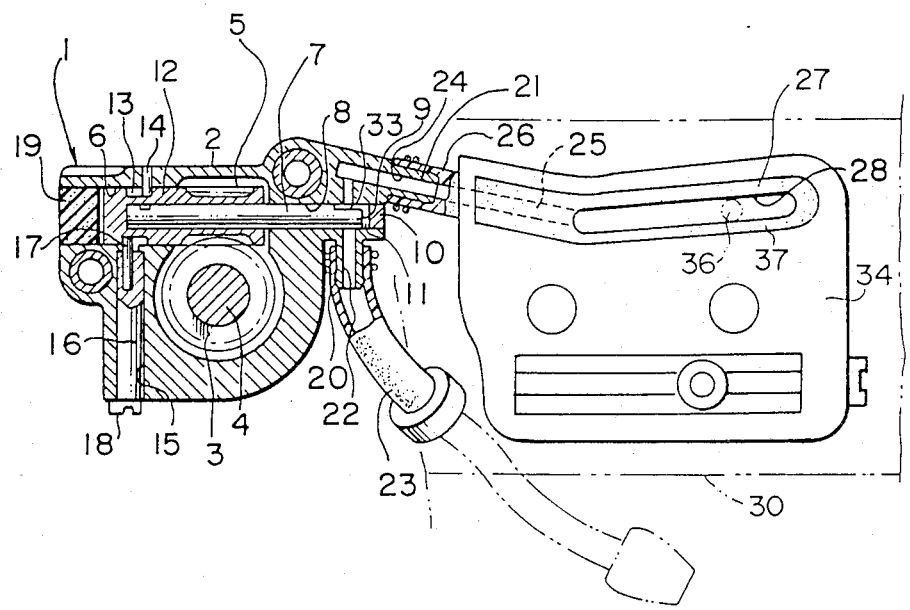
FIG. 1 is a fragmentary longitudinal cross-sectional view of essential parts of a chain saw which is an embodiment of the present invention.
Figure 2:
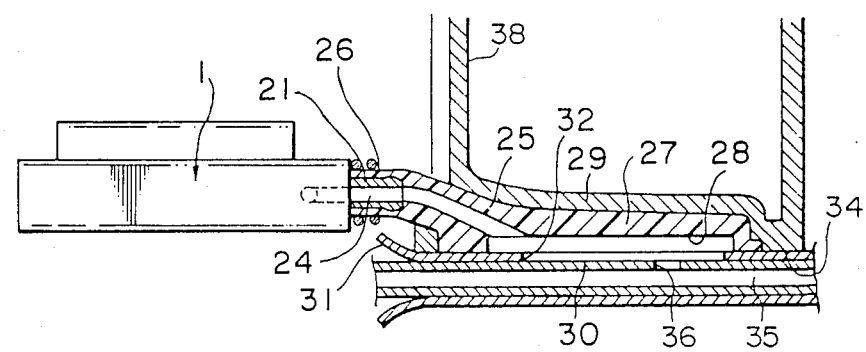
FIG. 2 is a fragmentary transverse cross-sectional view of the essential parts of the chain saw shown in FIG. 1.

An oil pump for use in a chain saw which represents an embodiment of the present invention will be described below with reference to the accompanying drawings.

An oil pump 1 is adapted to supply oil to a saw chain (not shown) of a chain saw. A main body 2 of the oil pump 1 is fixed in a position adjacent to that of a lubricating oil tank 38 in the main body of the chain saw. A warm 3 is attached to one end of a shaft which is rotatably supported on the main body 2. The other end of the shaft 4 is driven by being connected to the output shaft of an internal combustion engine (not shown) mounted on the main body of the chain saw.

A plunger 7 which has a gear portion 5 adapted to be engaged with the worm 3 is fitted into bores 6 and 8 formed in the main body 2 so as to be rotatable and movable in the axial direction. The gear portion 5 is made of a suitable synthetic resin and is integrally and coaxially molded onto the plunger 7 which is provided as a needle roller commonly available on the market formed from a suitable metal material which is worked to a degree of high accuracy. The plunger 7 projects from the gear portion 5 in the axial direction and constitutes a pumping plunger of the pump 1. A pumping chamber 11 is defined between the tip 9 of one end of the plunger 7 and a closing member 10 adapted to close the end of the bore 8.

The plunger 7 also has a cam portion 12 which is integrally formed by molding at the other axial end of the plunger along with the gear portion 5, and a grooved cam 13 is formed around the cam portion 12. Thus the plunger 7, gear portion 5 and cam portion 12 effectively form one integral piece. A guide pin 14 which projects inward from the inner peripheral surface of the bore 6 is embedded in the main body 2, and the inner end of the guide pin 14 projects toward the grooved cam 13. A shaft 16 is rotatably fitted into a bore 15 which is formed in the main body 2 so as to be perpendicular to the bore 6 formed at the side of the cam portion 12. The inner end of the shaft 16 has an eccentric pin 17 which is eccentric relative to the shaft 16 and which projects in the axial direction toward the grooved cam 13 at a position opposite to that of the guide pin 14. In this arrangement, the reciprocating movement of the cam portion 12 in the axial direction is limited by the guide pin 14 and the eccentric pin 17. That is, the range of the reciprocating motion of the cam portion 12 can be varied by changing the position of the eccentric pin 17 at the outer end 18 of the shaft 16 by rotating the shaft 16. The outer end of the bore 6 on the side of the cam portion 12 is closed by a closing member 19 made of sponge rubber impregnated with grease. The closing member 19 functions to prevent dust entering and retain the grease.

The main body 2 has an inlet nipple 20 and an outlet nipple 21 which are integrally formed with the main body 2 in positions near the pumping chamber 11. The inlet nipple 20 forms an inlet passage 22 which opens through the inlet nipple 20 to the side of the pumping chamber 11. The inlet passage 22 communicates with the oil tank 38 through a flexible pipe 23 which is fitted and connected to the inlet nipple 20. Similarly, the outlet nipple 21 forms an outlet passage 24 which communicates with the pumping chamber 11 through the outlet nipple 21. The outlet passage 24 opens into the pumping chamber 11 at the side thereof diametrally opposite to that at which the inlet passage 22 opens.

One end 26 of a flexible pipe 25 made of an elastic material such as rubber or synthetic resin is fitted and connected to the outlet nipple 21, and the other end 27 of the flexible pipe 25 has a laterally elongated opening 28 encircled by an exposed end surface 37 which generally coincides with a mounting seat surface 34 of a guide bar 30. The exposed end surface 37 of the flexible pipe 25 is pressed from the rear side by a part 29 of the main body of the chain saw so that it is closely fitted to a side plate 31 on the side of the mounting seat surface 34 of the guide bar 30 which guides the travelling of a saw chain. The opening 28 in the exposed end surface 37 communicates with an oil supply opening 36 formed in the guide bar 30 through a corresponding elongated opening 32 formed in the side plate 31.

When, in this arrangement, the worm 3 is rotated by the driving force of the internal combustion engine of the chain saw, the gear portion 5 which is engaging with the worm 3 rotates and reciprocatingly moves together with the plunger 7 in the axial direction. This reciprocating motion is effected within a range set by the grooved cam 13 and pins 14 and 17. The volume of the pumping chamber 11 is increased or decreased by the reciprocating motion of the tip 9 of the plunger 7 thereby caused. At the time of a suction stroke in this pumping operation which increases the volume of the pumping chamber 11, the outlet passage 24 is closed by the tip 9 of the plunger 7 but the inlet passage 22 communicates with the pumping chamber 11 through a cut portion 33 formed in the tip 9 of the plunger 7 by additionally cutting the needle roller, so that oil in the oil tank 38 is drawn into the pumping chamber 11 by way of the flexible pipe 23 and the inlet passage 22. At the time of a discharge stroke which decreases the volume of the pumping chamber 11, the inlet passage 22 is closed by the tip 9 of the plunger 7 but the outlet passage 24 communicates with the pumping chamber 11 through the cut portion 33 so that oil in the pumping chamber 11 is discharged into the saw chain guide groove 35 through the oil supply opening 36 of the guide bar 30 by way of the outlet passage 24 and the flexible pipe 25, thereby lubricating the saw chain. The rate of the discharge of oil from the pumping chamber 11 is adjusted by rotating the shaft 16 so as to select a suitable position of the eccentric pin 17 and adjust the stroke of the reciprocating motion of the plunger 7.

What is claimed is:

1. An oil pump for supplying lubricating oil to a saw chain of a chain saw, said oil pump comprising
    a pumping plunger formed of a cylindrical shaft having a cylindrical surface, with a portion removed from said cylindrical surface at a first end of said shaft,
    gear and cam portions formed as separate pieces from said shaft, and fitted and connected to said shaft so as to move as one integral piece for rotation and reciprocation of said plunger, and
    a guide pin and an eccentric pin supported near said second end of said shaft and on opposite sides of said shaft, and a cam groove formed in said cam portion to extend around said shaft, wherein said guide pin and eccentric pin extend into said cam groove, and said cam groove is shaped so that said reciprocation results from said rotation, with a range of said reciprocation limited by the positions of said guide pin and eccentric pin and the shape of said cam groove.

2. The pump of claim 1, comprising a pumping chamber formed at said first end of said shaft with inlet and outlet ports for said oil on opposite sides of said shaft at said first end of said shaft, wherein said oil is pumped via said inlet into said pumping chamber as a result of said reciprocation being in a first direction along said shaft and out of said pumping chamber, at which time said removed portion of said shaft is adjacent said inlet, and said oil is pumped out said pumping chamber via said outlet when said reciprocation is opposite said first direction and into said pumping chamber, said removed portion of said shaft then being adjacent said outlet.

3. The pump of claim 2, comprising adjusting means for changing said position of said eccentric pin to vary one limit of said range of reciprocation, to thereby vary the volume of said oil that is pumped with each rotation of said shaft.

4. The pump of claim 3, wherein no spring is needed for said pumping of oil.

5. The pump of claim 3, wherein during said changing said position of said eccentric pin for adjusting the volume of oil pumped with each rotation of said shaft, while maintaining constant a predetermined phase between respective periods of said rotation and reciprocation.

6. An oil pump for supplying lubricating oil to the saw chain of a chain saw, said oil pump comprising
    a pumping plunger formed of a cylindrical shaft having a cylindrical surface, with a portion removed from said cylindrical surface at a first end of said shaft,
    a pumping chamber formed at said first end of said shaft,
    a cam portion integrally molded onto the other end of said shaft, and a gear portion integrally molded with said cam portion onto said shaft at a position between said ends of said shaft, so as to move as one integral piece for the rotation and reciprocation of said plunger, and
    a guide pin and an eccentric pin supported near said second end of said shaft and on opposite sides of said shaft, and a cam groove formed in said cam portion to extend around said shaft, wherein said guide pin and eccentric pin extend into said cam groove, and said cam groove is shaped so that said reciprocation results from said rotation, with a range of said reciprocation limited by the positions of said guide pin and eccentric pin and the shaft of said cam groove.

7. The pump of claim 6, comprising said pumping chamber formed at said first end of said shaft with inlet and outlet ports for said oil on opposite sides of said shaft at said first end of said shaft, wherein said oil is pumped via said inlet into said pumping chamber as a result of said reciprocation being in a first direction along said shaft and out of said pumping chamber, at which time said removed portion of said shaft is adjacent said inlet, and said oil is pumped out said pumping chamber via said outlet when said reciprocation is opposite said first direction and into said pumping chamber, said removed portion fo said shaft then being adjacent said outlet.

8. The pump of claim 7, comprising adjusting means for changing said position of said eccentric pin to vary one limit of said range of reciprocation, to thereby vary the volume of said oil that is pumped with each rotation of said shaft.

9. The pump of claim 8, wherein no spring is needed for said pumping of oil.

10. The pump of claim 8, comprising means for changing said location of said eccentric pin along said first direction, for adjusting the volume of oil pumped with each rotation of said shaft while maintaining constant a predetermined phase between respective periods of said rotation and reciprocation.

* * * * *